Dec. 25, 1962  M. S. WORLEY  3,069,829
METHOD AND APPARATUS FOR DEHYDRATING GAS
Filed May 28, 1958
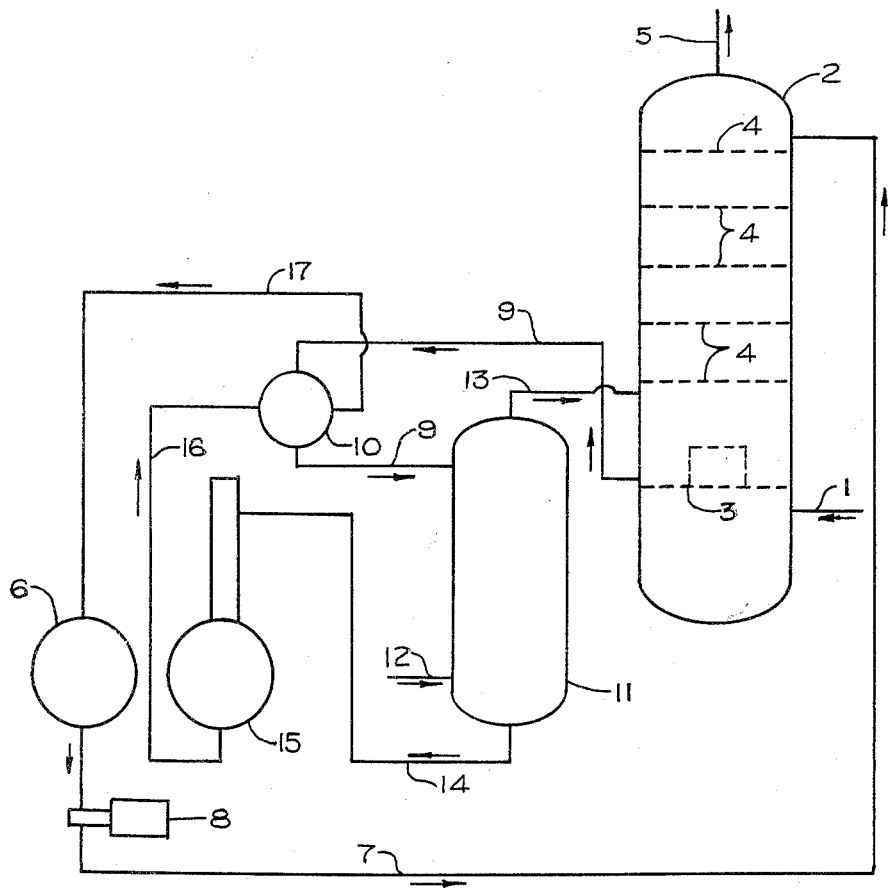
MARVIN S. WORLEY
INVENTOR.
BY *Jack R. Spriggate*
ATTORNEY 3,069,829
METHOD AND APPARATUS FOR
DEHYDRATING GAS
Marvin S. Worley, Oklahoma City, Okla., assignor to Black, Sivalls & Bryson, Inc., Kansas City, Mo., a corporation of Delaware
Filed May 28, 1958, Ser. No. 738,431
5 Claims. (Cl. 55—32)

The present invention relates generally to a method and apparatus for dehydrating natural gas streams and particularly for dehydrating natural gas streams which are commonly termed "sour" gas streams.

Natural gas streams which are termed "sour" are so termed because of the hydrogen sulfide which is mixed with the natural gas. This component of such gas streams can, through proper processing, be a very useful source of raw sulfur. Therefore, it may be desirable to flow the sour natural gas stream to a processing plant where the hydrogen sulfide can be removed and processed to form sulfur.

It has commonly been experienced in the transportation of natural gas through pipelines that during cold weather gas hydrates may form causing a blocking of the natural gas stream flowing therethrough. To combat such trouble and also to prevent the collection of water in a gas line which will cause pressure losses, such gas streams are normally dehydrated as close to their source as possible. Well head dehydration units which contact the gas stream intimately with a dehydrating agent such as triethylene glycol cause considerable air pollution when installed to dehydrate a natural gas stream containing hydrogen sulfide. The offensive nature of such units arises from the absorption of some of the hydrogen sulfide by the dehydrating agent and the subsequent release of the hydrogen sulfide to the atmosphere by the dehydrating agent reconcentrator. Such a release of hydrogen sulfide not only causes an air pollution problem with its attendant corrosive effects on surrounding structures but further causes a loss of revenue because the sulfur in the released hydrogen sulfide cannot be recovered. The vapors released by the dehydrating agent reconcentrator contain only a portion of the hydrogen sulfide contained in the natural gas stream since the dehydrating agents are not circulated in sufficient quantity to absorb all of the hydrogen sulfide.

Therefore, the primary object of the present invention is to provide a method and apparatus for dehydrating a natural gas stream containing hydrogen sulfide.

A further object of the present invention is to provide a method and apparatus for dehydrating a sour natural gas stream whereby the hydrogen sulfide absorbed from the stream is returned to the stream.

A still further object of the present invention is to provide a method and apparatus for removing absorbed hydrogen sulfide from a dehydrating agent and returning the hydrogen sulfide to the natural gas stream from which it was absorbed.

In accomplishing these and other objects of the present invention I have provided improved method and apparatus illustrated in the accompanying drawing wherein:

The FIGURE is a schematic diagram of a system embodying the novel features of the present invention.

Referring more in detail to the drawing:

A natural gas stream containing hydrogen sulfide is conducted through duct 1 into the lower portion of contactor 2 below chimney tray 3. A plurality of contacting trays 4 are mounted in contactor 2 above chimney tray 3. Gas, after being dried by thorough contact with a dehydrating agent on contacting tray 4, is discharged from contactor 2 through gas outlet 5.

Lean dehydrating agent is pumped from dehydrating agent reservoir tank 6 through line 7 into contactor 2 onto upper contacting tray 4 by pump 8. The dehydrating agent flows downwardly through contactor 2 over contacting trays 4 and collects on chimney tray 3. The dehydrating agent collecting on chimney tray 3 will be diluted by the water which it has absorbed in its contact with the natural gas stream and also will contain some hydrogen sulfide which it has absorbed from the natural gas stream. The dilute dehydrating agent is discharged from contactor 2 through line 9 and heat exchanger 10 into the upper portion of stripping vessel 11.

Stripping vessel 11 is provided with suitable means for causing intimate contact between the dilute dehydrating agent which has absorbed hydrogen sulfide and a quantity of sweet gas. The sweet gas (gas containing no hydrogen sulfide) is conducted into the lower portion of stripping vessel 11 by duct 12 and is discharged from the upper portion thereof after intimate contact with the dehydrating agent therein through duct 13. The gas, having stripped the hydrogen sulfide from the dehydrating agent, is conducted through duct 13 into contactor 2 at a position below contacting trays 4 and above chimney tray 3. Sweet gas to be supplied to stripping vessel 11 can usually be obtained from the central processing unit which removes the hydrogen sulfide from the natural gas stream or any other suitable source.

The dilute dehydrating agent is removed from stripping vessel 11, free of hydrogen sulfide, and conducted through duct 14 to dehydrating agent reconcentrator 15 where the absorbed water is removed from the dehydrating agent. Lean hot dehydrating agent flows from reconcentrator 15 through line 16, heat exchanger 10, line 17 into reservoir tank 6. The hot dehydrating agent flowing through heat exchanger 10 is cooled by warming of the dilute dehydrating agent flowing therethrough from contactor 2 to stripping vessel 11.

The present invention has provided a novel method and apparatus for dehydrating a sour natural gas stream which avoids air pollution and the external corrosion incident to the release of hydrogen sulfide into the air. Further, this invention makes provision for the return of the hydrogen sulfide which is absorbed from the sour gas stream during dehydration to the gas stream so that in the sulfur recovery processes all of the hydrogen sulfide produced with the natural gas will be available in the gas stream for conversion into sulfur.

What I claim and desire to secure by Letters Patent is:

1. The method of dehydrating a sour natural gas stream comprising, flowing said gas stream into a contacting zone, flowing a liquid dehydrating agent into intimate contact with said gas stream within said contacting zone, discharging dehydrated sour gas from said contacting zone, flowing said dehydrating agent from said contacting zone to a stripping zone, flowing sweet gas into intimate contact with said dehydrating agent in said stripping zone to remove the hydrogen sulfide from said dehydrating agent which has been absorbed from said gas stream by said dehydrating agent within said contacting zone, flowing said sweet gas and said hydrogen sulfide from said stripping zone into said contacting zone, flowing said dehydrating agent from said stripping zone, reconcentrating said dehydrating agent and recirculating the reconcentrated dehydrating agent to said contacting zone.

2. A dehydrating apparatus for a sour natural gas stream comprising, a contactor, said contactor having a gas inlet, a gas outlet, a dehydrating agent inlet, a dehydrating agent outlet and a stripping gas inlet, a stripping vessel, said stripping vessel having a gas inlet, a gas outlet, a liquid inlet and a liquid outlet, a dehydrating agent reconcentrator having an inlet and an outlet, a dehydrating agent pump, means connecting said reconcentrator outlet through said pump to said dehydrating agent inlet of said contactor, means connecting said dehydrating agent outlet of said contactor to said liquid inlet of said stripping vessel, means connecting said liquid outlet of said stripping vessel to said reconcentrator inlet, means connecting said gas outlet of said stripping vessel to said stripping gas inlet of said contactor, means supplying sweet gas to said gas inlet of said stripping vessel and means connecting said sour natural gas stream to said gas inlet of said contactor.

3. The method of dehydrating a sour natural gas stream in accordance wtih claim 1 including, the step of heating said dehydrating agent subsequent to its discharge from said contacting zone and prior to its introduction into said stripping zone.

4. The method of dehydrating a sour natural gas stream in accordance with claim 3 wherein said heating of said dehydrating agent is accomplished by flowing said reconcentrated dehydrating agent into heat exchange with said dehydrating agent flowing from said contacting zone to said stripping zone.

5. A dehydrating apparatus for a sour natural gas stream comprising, a contactor, said contactor having a gas inlet, a gas outlet, a dehydrating agent inlet, a dehydrating agent outlet and a stripping gas inlet, a stripping vessel, said stripping vessel having a gas inlet, a gas outlet, a liquid inlet and a liquid outlet, a dehydrating agent reconcentrator having an inlet and an outlet, a dehydrating agent pump, a heat exchanger, means connecting said reconcentrator outlet to said heat exchanger, means connecting said heat exchanger to said pump, means connecting said pump to said dehydrating agent inlet of said contactor, means connecting said dehydrating agent outlet of said contactor to said heat exchanger, means connecting said heat exchanger to said liquid inlet of said stripping vessel, means connecting said liquid outlet of said stripping vessel to said reconcentrator inlet, means connecting said gas outlet of said stripping vessel to said stripping gas inlet of said contactor, means supplying sweet gas to said gas inlet of said stripping vessel and means connecting said sour natural gas stream to said gas inlet of said contactor.

References Cited in the file of this patent

UNITED STATES PATENTS

| 2,574,644 | Landau | Nov. 13, 1951 |
| 2,847,361 | Hengstebeck | Aug. 12, 1958 |

FOREIGN PATENTS

| 611,224 | Great Britain | Oct. 27, 1948 |
| 728,444 | Great Britain | Apr. 20, 1955 |
| 866,780 | France | June 9, 1941 |